United States Patent [19]
Sprang et al.

[11] Patent Number: 5,340,220
[45] Date of Patent: Aug. 23, 1994

[54] PIVOTING BEARING FOR MOUNTING PULL RODS IN MOTOR VEHICLES

[75] Inventors: Ruediger Sprang, Ostercappeln; Andreas Vossel, Osnabrück; Werner Schmudde, Bersenbrück; Reinhard Buhl, Bohmte, all of Fed. Rep. of Germany

[73] Assignee: Lemforder Metallwaren AG, Lemforde, Fed. Rep. of Germany

[21] Appl. No.: 975,431

[22] Filed: Nov. 12, 1992

[30] Foreign Application Priority Data

Nov. 23, 1991 [DE] Fed. Rep. of Germany ....... 4138582

[51] Int. Cl.$^5$ ............................................. F16F 1/42
[52] U.S. Cl. ................................... 384/125; 384/202; 384/215; 267/279
[58] Field of Search ............... 384/125, 192, 202, 215, 384/220; 180/376, 383; 267/141.2, 281, 279

[56] References Cited

U.S. PATENT DOCUMENTS

| | | | |
|---|---|---|---|
| 3,421,799 | 1/1969 | Tallian et al. | 384/125 X |
| 3,907,122 | 9/1975 | Ksienysk et al. | 267/279 X |
| 4,634,108 | 1/1987 | Munch | 267/279 |
| 4,907,814 | 3/1990 | Foster | 382/202 |
| 4,916,749 | 4/1990 | Urban et al. | 384/125 X |

FOREIGN PATENT DOCUMENTS

| | | |
|---|---|---|
| 66065347 | 10/1970 | Fed. Rep. of Germany . |
| 2144507C2 | 3/1973 | Fed. Rep. of Germany . |
| 3419967A1 | 12/1985 | Fed. Rep. of Germany . |
| 1407673 | 6/1965 | France . |
| 1-30937 | 2/1989 | Japan .................. 267/141.2 |
| 1078641 | 8/1967 | United Kingdom . |

*Primary Examiner*—Daniel P. Stodola
*Assistant Examiner*—John P. Darling
*Attorney, Agent, or Firm*—McGlew & Tuttle

[57] ABSTRACT

A pivoting bearing for mounting pull rods in motor vehicles, which includes a metallic housing (2) with a cylindrical inner jacket, a metallic inner part (1), and an elastomer body (3) arranged between the housing (2) and the inner part (1). The elastomer body (3) compensates axial, radial, and cardanic movements of the housing (2) in relation to the inner part (1) by molecular deformation. The elastomer body (3), which cooperates with the cylindrical inner jacket of the housing radially in the outward direction, is arranged adheringly on the inner part (1) and is pre-tensioned axially between plate rings (4, 5). The external diameter of the plate rings (4 and 5) is undersized compared with the internal diameter of the inner jacket of the housing. A sliding surface is obtained on the cylindrical outer jacket of the elastomer body under the axial pre-tensioning of this. This sliding surface permits rotary movement of the inner part (1) in the housing (2).

12 Claims, 2 Drawing Sheets

PIVOTING BEARING FOR MOUNTING PULL RODS IN MOTOR VEHICLES

FIELD OF THE INVENTION

The present invention pertains in general to a pivoting bearing for mounting pull rods in motor vehicles and in particular to pivot bearing containing an elastomer body surrounded by a housing, wherein a sliding surface is obtained between the elastomer body and the housing.

BACKGROUND OF THE INVENTION

A similar pivoting bearing has been known from German Patent DE 21,44,507-C2. It permits radial, axial, and cardanic movements of the inner parts in relation to the housing due to molecular deformations of a rubber body. This rubber body is arranged between plate rings, to which it is connected by vulcanization. One of the plate rings is supported in an internally cylindrical housing on a shoulder, and the other plate ring is secured and held by a lock washer during the assembly of the bearing after axial pretensioning of the rubber body, so that frictionally engaged adhesion of the rubber body to the cylindrical jacket surface of the housing is achieved due to the forces resulting from the axial deformation of the rubber body. Such bearings are unsuitable for wide movements of the pull rod, which occur especially in triangular pull rods in vehicles with pneumatic spring action, because extreme deflections of the pull rod lead to excessive stretching of the rubber body.

The idea of combining such a joint with the effects of a molecular joint has been known from German Patent DE 34,19,967-A1.

FIGS. 3 and 4 of West German Utility Patent No. 66,06,534 and the corresponding part of the specification disclose a joint in which plate rings are arranged axially on both sides, and the actual rubber-metal ball joint is loosely introduced into a bore of the outer housing and is then axially deformed via the plate rings, so that the elastomer body is pressed against the inner jacket of the housing bore, but that the elastomer body can slip through when a defined torsional moment is exceeded. However, this can be considered to be only one type of protection against rupture.

GB 1,078,641 discloses a rotary slide bearing, in which a rubber body is attached to an inner part in a stress-free manner and is mounted rotatably in a cylindrical housing. However, such a bearing has only low axial load-bearing capacity.

FR 1,407,673 discloses a rotary slide bearing, in which the inner part is elliptical, so that the rubber body is slidingly movable on this elliptical part, and restoring forces are built up as the deflection of the inner part in relation to the housing, in which the rubber body is fixed, increases. Such a pivoting bearing also compensates only the radial movements of the inner part and of the housing relative to one another due to molecular deformation of the rubber body.

Finally, German Patent DE 37,15,360-C2 discloses a molecular joint of the class in which material recesses are provided in a middle zone on the inner surface of the internally cylindrical housing, and these recesses reduce the pre-tension of an elastomer body in this area in order to reach a progressively changing spring rate as the load increases.

SUMMARY AND OBJECTS OF THE INVENTION

The task of the present invention is to deliberately ensure a torsional movement with large torsion angles and low torque at high radial and axial force absorption and suitable spring rigidity of the elastomer body even under cardanic suspensions, while maintaining all the advantages of a molecular joint of the class described in the introduction.

An inner part is positioned inside a housing. In between the housing and the inner part there is an elastomer body. The elastomer body has an outer circumference which defines a groove means for forming a sliding surface on the outer circumference when the elastomer body is in an axially compressed state. The sliding surface means slidably contacts a cylindrical inner jacket of the housing. The sliding surface means permits rotary movement between the elastomer body which is connected to the inner part and the housing. The first and second plate rings are positioned on substantially opposite axial sides of the elastomer body and there is a compression means between the plate rings and the housing which hold the elastomer body in the axially compressed state. The outer circumference can have a grooved surface geometry in a stress free state. In the axially compressed state, the sliding surface means can have a crowned, rotationally symmetrical outer contour or the sliding surface means can have a substantially cylindrical outer contour. The plate rings can also be connected to the elastomer body in an adhering manner.

One essential characteristic of the present invention is the combination of a molecular joint with a joint which is rotatable under operating conditions. Contrary to prior-art designs, in which the inner part and the housing are connected to one another by the elastomer body, and slipping through of the bearing parts connected to one another is provided for at best under overload conditions, the joint designed according to the present invention permits a torsional movement with low torque, but it is nevertheless able to absorb high radial and axial loads.

In the pre-assembled, i.e., axially stress-free state, the elastomer body has, in a central circumferential area, a crowned jacket surface geometry and, next to it on both sides, a circumferential recessed jacket surface geometry, so that an approximately cylindrical outer contour of the elastomer body will be obtained under the axial pre-tension in the assembled state of the pivoting bearing. Taking into account the requirements imposed on the pivoting bearing during operation, the cylindrical outer contour that becomes established under the axial pre-tension of the elastomer body may have a slight upward or downward deviation or zero deviation from the specified dimension. This deviation is so that slipping through can be achieved with or without initial breakaway torque. To increase the continuous load-bearing capacity, additional sliding means may be inserted between the outer surface of the elastomer body and the inner jacket of the housing. Due to the incompressibility and the resulting volume constancy of the elastomeric material, as well the differences in the extent to which transverse strain is hindered in the radial direction over the length, the contour of the elastomer body in the stress-free state is determined—for bearings with spherical inner part—by the geometric ratio of the groove diameter to the crown diameter of the crowned area and the distance between the groove and the overall initial length of the elastomer body.

One peculiarity of the present invention is the fact that in the built-in state, the elastomer body arranged axially between the plate rings connected to the elastomer body in an adhesive manner has a slightly crowned, rotationally symmetrical outer contour under axial pretension, and the largest diameter of this outer contour approximately corresponds to the internal diameter of the cylindrical housing, so that the adjacent areas do not touch the inner surface of the housing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
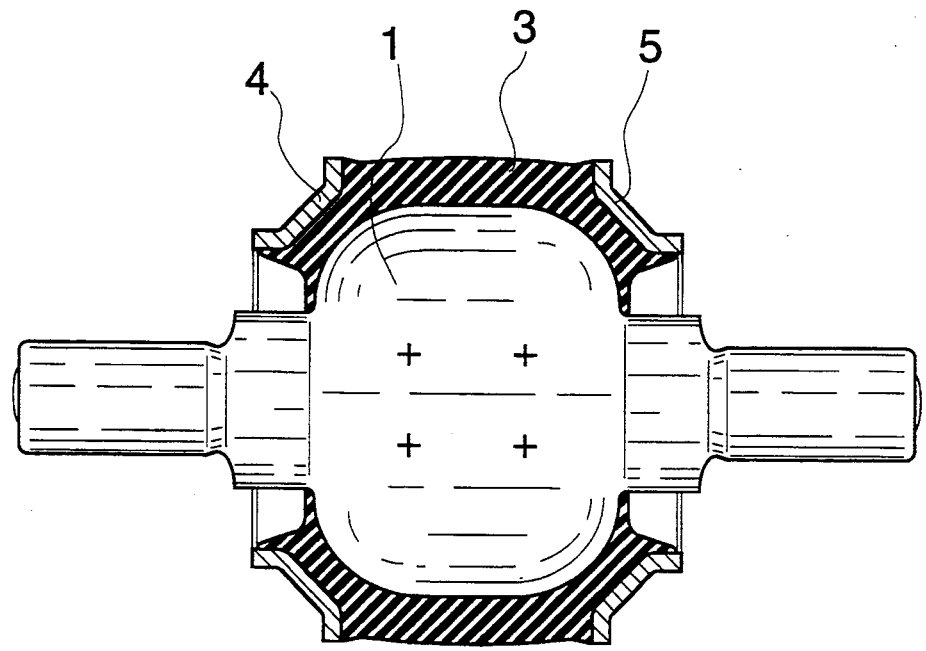
FIG. 1 shows a longitudinal section through an elastomer body arranged adhering on a spherical body.
Figure 2:
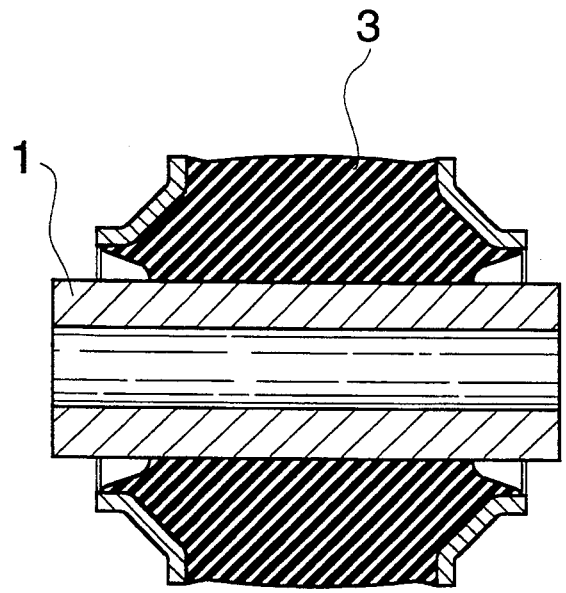
FIG. 2 shows the same longitudinal section through an elastomer body arranged adhering on an inner bushing.
Figure 3:
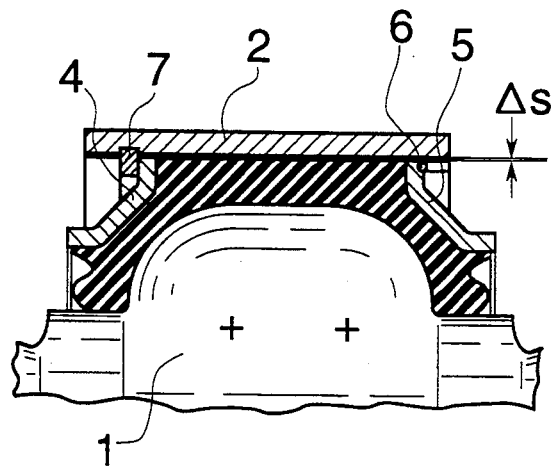
FIG. 3 shows a longitudinal section corresponding to FIG. 1 through a mounted pivoting bearing.
Figure 4:
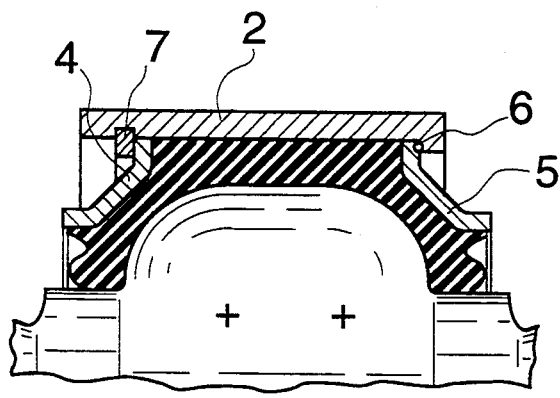
FIG. 4 shows a longitudinal section corresponding to FIG. 3 of a design variant.
Figure 5:
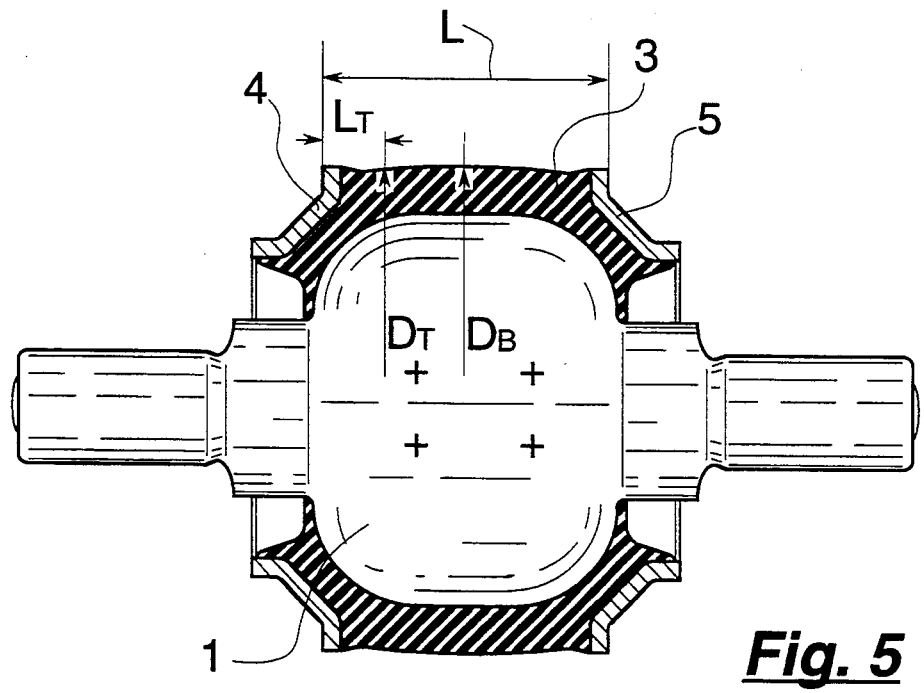
FIG. 5 shows a representation corresponding to FIG. 1 on a slightly larger scale.

Corresponding to the representation in FIGS. 3 and 4, the pivoting bearing consists of an inner part 1, a housing 2, and an elastomer body 3 arranged between them. FIGS. 1, 3, 4, and 5 show exemplary embodiments with the spherical inner part 1, which has, at both ends, mounting pins for connection to a motor vehicle part. FIG. 2 shows an exemplary embodiment with a tubular inner part 1. The elastomer body 3 is arranged adhering to the inner part 1, and is connected to it by, e.g., vulcanization. Plate rings 4 and 5, which are also firmly connected to the elastomer body 3 by, e.g., vulcanization, are located on the front sides of the elastomer body 3. The cross-sectional contour of the plate rings 4 and 5, which appears from the drawing, is known. However, the external diameter of the plate rings 4 and 5 is undersized compared with the internal diameter of the cylindrical part of the housing 2, so that the plate rings 4 and 5 are movable in the housing 2 axially and in the direction of rotation. In the pre-assembled, i.e., stress-free state, the elastomer body 3 has the geometry shown in FIGS. 1, 2, and 5. The middle area is circumferentially crowned in terms of rotational symmetry, and a groove having a shape reducing a diameter of the elastomer body 3 is located next to the middle area on both sides. The groove is likewise circumferentially shaped, in such a way that an approximately cylindrical jacket surface will be obtained on the outer circumference of the elastomer body 3 during predetermined axial deformation of the elastomer body 3. In the mounted state of the pivoting bearing, one of the plate rings 5 is supported by an inner shoulder 6 on the housing 2. The other plate ring 4 is secured and held by a lock washer 7, after the elastomer body 3 has been compressed in axial direction during the assembly of the pivoting bearing. The elastomer body 3 is compressed to the extent that the lock washer 7 can be inserted into a groove, provided for this propose, on the inner circumference of the housing 2. As is apparent from the representation in FIG. 3, the now cylindrical outer circumference of the elastomer body 3 may have a slight upward deviation, zero deviation, or a slight downward deviation frown the specified dimension in relation to the inner circumference of the housing 2. This deviation is so that slipping through, i.e., rotary movement of the elastomer body 3 relative to the housing 2 can take place with or without an initial breakaway torque. As is apparent from FIG. 4, the jacket surface of the elastomer body may also have a slightly crowned contour under the axial pretension in the elastomer body, so that the middle area is supported by the inner jacket of the housing 2, and the end zones are not in contact with the housing wall. The person skilled in the art is able to determine the geometry of the elastomer body in the predetermined state based, on his expert knowledge, frown the geometric ratio of the groove diameter DT to the diameter DB of the crowned middle area, as well as frown the distance LT between the groove and the zero point of the initial length.

While specific embodiments of the invention have been shown and described in detail to illustrate the application of the principles of the invention, it will be understood that the invention may be embodied otherwise without departing from such principles.

What is claimed is:

1. A pivot bearing for mounting pull rods in motor vehicles, the pivot bearing comprising:
   an inner part;
   a housing surrounding said inner part, said housing having a cylindrical inner jacket;
   an elastomer body positioned between said inner part and said housing, said elastomer body being connected to said inner part, said elastomer body having an outer circumference defining groove means for forming a sliding surface on said outer circumference when said elastomer body is in an axially compressed state, said sliding surface slidably contacting said cylindrical inner jacket for rotary movement between said inner part and said housing;
   first and second plate rings positioned on substantially opposite axial sides of said elastomer body; and
   compression means for rotatably connecting said first and second plate rings to said housing and holding said elastomer body in said axially compressed state.

2. A pivot bearing in accordance with claim 1, wherein: said outer circumference has a grooved surface geometry in a stress-free state.

3. A pivot bearing in accordance with claim 1, wherein:
   said housing and said inner part are metallic;
   said elastomer body undergoes molecular deformation during axial, radial and cardanic movements said housing and said inner part.

4. A pivot bearing in accordance with claim 1, wherein: said plate rings have an outer diameter substantially equal to or smaller than an inner diameter of said cylindrical inner jacket.

5. A pivot bearing in accordance with claim 1, wherein:

said sliding surface has a crowned, rotationally symmetrical outer contour in said axially compressed state, a largest outer diameter of said siding surface substantially corresponding to an internal diameter of said cylindrical inner jacket of said housing.

6. A pivot bearing in accordance with claim 1, wherein:

said first and second plate rings are adheringly connected to said elastomer body.

7. A pivot bearing in accordance with claim 1, wherein:

said sliding surface has a substantially cylindrical outer contour in said axially compressed state.

8. A pivot bearing in accordance with claim 1, wherein:

said outer circumference has a crowned middle portion with grooves on opposite axial sides of said crowned middle portion.

9. A pivot bearing in accordance with claim 1, wherein:

said plate rings have an outer diameter smaller than an inner diameter of said cylindrical inner jacket.

10. A pivot bearing in accordance with claim 1, wherein:

said outer circumference of said elastomer body has a diameter which is larger than an internal diameter of said cylindrical inner jacket of said housing.

11. A pivot bearing in accordance with claim 1, wherein:

said outer circumference of said elastomer body has a diameter which is substantially equal to an internal diameter of said cylindrical inner jacket of said housing.

12. A pivot bearing in accordance with claim 1, wherein:

said outer circumference of said elastomer body has a diameter which is smaller than an internal diameter of said cylindrical inner jacket of said housing.

* * * * *